(12) United States Patent
McCulloch et al.

(10) Patent No.: US 10,620,717 B2
(45) Date of Patent: Apr. 14, 2020

(54) POSITION-DETERMINING INPUT DEVICE

(71) Applicant: Microsoft Technology Licensing, LLC, Redmond, WA (US)

(72) Inventors: Daniel Joseph McCulloch, Snohomish, WA (US); Nicholas Gervase Fajt, Seattle, WA (US); Adam G. Poulos, Sammamish, WA (US); Christopher Douglas Edmonds, Carnation, WA (US); Lev Cherkashin, Redmond, WA (US); Brent Charles Allen, Kirkland, WA (US); Constantin Dulu, Redmond, WA (US); Muhammad Jabir Kapasi, Sammamish, WA (US); Michael Grabner, Seattle, WA (US); Michael Edward Samples, Redmond, WA (US); Cecilia Bong, Sammamish, WA (US); Miguel Angel Sussfalich, Kirkland, WA (US); Varun Ramesh Mani, Redmond, WA (US); Anthony James Ambrus, Seattle, WA (US); Arthur C. Tomlin, Kirkland, WA (US); James Gerard Dack, Seattle, WA (US); Jeffrey Alan Kohler, Redmond, WA (US); Eric S. Rehmeyer, Kirkland, WA (US); Edward D. Parker, Kirkland, WA (US)

(73) Assignee: Microsoft Technology Licensing, LLC, Redmond, WA (US)

( * ) Notice: Subject to any disclaimer, the term of this patent is extended or adjusted under 35 U.S.C. 154(b) by 289 days.

(21) Appl. No.: 15/199,742

(22) Filed: Jun. 30, 2016

(65) Prior Publication Data
US 2018/0004308 A1    Jan. 4, 2018

(51) Int. Cl.
*G06F 3/03*     (2006.01)
*G06F 3/038*    (2013.01)
(Continued)

(52) U.S. Cl.
CPC ............ *G06F 3/0325* (2013.01); *G06F 3/011* (2013.01); *G06F 3/017* (2013.01); *G06F 3/0346* (2013.01);
(Continued)

(58) Field of Classification Search
CPC ...... G06F 3/0325; G06F 3/017; G06F 3/0346; G06F 3/0383; G06F 3/011;
(Continued)

(56) References Cited

U.S. PATENT DOCUMENTS

| 6,512,607 B1 | 1/2003 | Windsor et al. |
| 7,173,604 B2 | 2/2007 | Marvit et al. |

(Continued)

FOREIGN PATENT DOCUMENTS

| WO | 2014088972 A1 | 6/2014 |
| WO | WO-2015167549 | 11/2015 |

OTHER PUBLICATIONS

"Creating the first Apple Watch Wearable Hologram at Microsoft Visitor Center Seattle", Available at: https://www.youtube.com/watch?v=S0Pskp4Z9WQ, Jul. 27, 2015, 2 pages.
(Continued)

*Primary Examiner* — Yaron Cohen
(74) *Attorney, Agent, or Firm* — Rainier Patents, P.S.

(57) ABSTRACT

In embodiments of a camera-based input device, the input device includes an inertial measurement unit that collects motion data associated with velocity and acceleration of the input device in an environment, such as in three-dimensional (3D) space. The input device also includes at least two visual light cameras that capture images of the environment. A positioning application is implemented to receive the motion data from the inertial measurement unit, and receive the images of the environment from the at least two visual light cameras. The positioning application can then determine
(Continued)

positions of the input device based on the motion data and the images correlated with a map of the environment, and track a motion of the input device in the environment based on the determined positions of the input device.

19 Claims, 5 Drawing Sheets

(51) Int. Cl.
  *G06F 3/01* (2006.01)
  *G06F 3/0346* (2013.01)
  *G06T 7/285* (2017.01)
(52) U.S. Cl.
  CPC ............ *G06F 3/0383* (2013.01); *G06T 7/285* (2017.01); *G06F 2203/0384* (2013.01); *G06T 2207/10021* (2013.01); *G06T 2207/30241* (2013.01)
(58) Field of Classification Search
  CPC ........... G06F 2203/0384; G06T 7/0044; G06T 2207/10028; G06T 7/285; G06T 2207/10021; G06T 2207/30241
  See application file for complete search history.

(56) References Cited

U.S. PATENT DOCUMENTS

| | | |
|---|---|---|
| 7,854,684 B1 | 12/2010 | Freeman et al. |
| 8,350,810 B2 | 1/2013 | Robbins et al. |
| 8,696,458 B2 | 4/2014 | Foxlin et al. |
| 8,743,224 B2 | 6/2014 | Harple et al. |
| 9,223,152 B1 | 12/2015 | Kress et al. |
| 2007/0222746 A1 | 9/2007 | LeVine |
| 2007/0286596 A1* | 12/2007 | Lonn ................. H04N 1/00387 396/429 |
| 2010/0225779 A1 | 9/2010 | Muukki |
| 2010/0302247 A1 | 12/2010 | Perez et al. |
| 2011/0181497 A1 | 7/2011 | Raviv |
| 2012/0092328 A1 | 4/2012 | Flaks et al. |
| 2012/0203453 A1 | 8/2012 | Lundquist et al. |
| 2013/0040737 A1* | 2/2013 | Raghoebardajal ... H04N 13/239 463/37 |
| 2013/0137076 A1 | 5/2013 | Perez et al. |
| 2013/0222874 A1 | 8/2013 | Sung et al. |
| 2013/0328762 A1 | 12/2013 | McCulloch et al. |
| 2013/0328927 A1 | 12/2013 | Mount et al. |
| 2014/0028712 A1 | 1/2014 | Keating et al. |
| 2014/0049558 A1 | 2/2014 | Krauss et al. |
| 2014/0049559 A1 | 2/2014 | Fleck et al. |
| 2014/0086124 A1* | 3/2014 | Knowles ........... H04W 52/0277 370/311 |
| 2014/0098018 A1 | 4/2014 | Kim et al. |
| 2014/0162730 A1 | 6/2014 | Kim |
| 2014/0168261 A1* | 6/2014 | Margolis ................. G06F 3/011 345/633 |
| 2014/0200077 A1* | 7/2014 | Mao ...................... A63F 13/212 463/31 |
| 2014/0267598 A1 | 9/2014 | Drouin et al. |
| 2014/0282008 A1 | 9/2014 | Verard et al. |
| 2014/0313225 A1 | 10/2014 | Lee et al. |
| 2014/0364209 A1 | 12/2014 | Perry |
| 2014/0375679 A1 | 12/2014 | Margolis et al. |
| 2015/0042682 A1 | 2/2015 | Jensen et al. |
| 2015/0043770 A1 | 2/2015 | Chen et al. |
| 2015/0204687 A1 | 7/2015 | Yoon et al. |
| 2015/0235434 A1 | 8/2015 | Miller et al. |
| 2015/0244747 A1 | 8/2015 | Wickenkamp et al. |
| 2015/0317834 A1 | 11/2015 | Poulos et al. |
| 2017/0363867 A1 | 12/2017 | Poulos et al. |
| 2018/0005445 A1 | 1/2018 | McCulloch et al. |

OTHER PUBLICATIONS

"International Search Report and Written Opinion", Application No. PCT/US2017/037104, dated Sep. 5, 2017, 12 pages.
"Non-Final Office Action", U.S. Appl. No. 15/199,831, dated Nov. 22, 2017, 30 pages.
Mamiit,"Google Glass Could Display Holograms over the Real World in the Future", Available at: http://www.techtimes.com/articles/91610/20151005/google-glass-could-display-holograms-over-the-real-world-in-the-future.htm, Oct. 5, 2015, 4 pages.
Morran,"Microsoft Shows off "Wearable" Holograms with HoloLens", Available at: hap://consumerist.com/2015/10/06/microsoft-shows-off-wearable-holograms-with-hololens/, Oct. 6, 2015, 4 pages.
"D1—Evaluate the Impact of a Potential Future Development in HCI", Retrieved From https://futuristicdevelopmentswithinhci.wordpress.com/2014/03/05/d1-evaluate-the-impact-of-a-potential-future-development-in-hci/, Mar. 5, 2014, 16 Pages.
"Holy Crap, This New Hololens Demo Is Freaking Crazy", Retrieved From https://www.youtube.com/watch?v=29xnzxgCx61, Oct. 6, 2015, 4 Pages.
"PS4 Pulse", Retrieved From https://web.archive.org/web/20160517144051/http://www.ps4playstation4.com/PS4-Controller-Pulse, Mar. 10, 2016, 10 Pages.
"The Playroom", Retrieved From https://web.archive.org/web/20150413014246/https://www.playstation.com/en-in/games/the-playroom-ps4/, Apr. 13, 2015, 8 Pages.
"Non-Final Office Action Issued in U.S. Appl. No. 15/184,681", dated Oct. 3, 2017, 9 Pages.
"Notice of Allowance Issued in U.S. Appl. No. 15/184,681", dated Mar. 1, 2018, 7 Pages.
Armstrong, Alex, "Microsoft HoloLens for a Mixed Reality Future", Retrieved From http://www.i-programmer.info/news/190-augmentedvirtual-reality-arvr/8549-microsoft-hololens-for-a-mixed-reality-future.html, May 6, 2015, 4 Pages.
James, Paul, "Leaked HoloLens 'Actiongram' Videos Show What Interacting with Windows in AR Looks Like", Retrieved From http://www.roadtovr.com/leaked-hololens-actiongram-videos-show-what-interacting-windows-in-ar-looks-like/, Mar. 4, 2016, 3 Pages.
Kinstner, Zach, "Hovercast VR Menu: Power at Your Fingertips", Retrieved From http://blog.leapmotion.com/hovercast-vr-menu-power-fingertips/, Feb. 14, 2015, 10 Pages.
Volpe, Joseph, "Microsoft's Mixed Reality is for Developers, Not the Public", Retrieved From http://www.engadget.com/2015/12/17/microsoft-hololens-is-for-developers-not-the-public/, Dec. 17, 2015, 13 Pages.
Heun,"Smarter Objects: Using AR Technology to Program Physical Objects and Their Interactions", In Proceedings of ACM SIGCHI Conference on Human Factors in Computing Systems, Apr. 27, 2013, 6 pages.
Molyneaux,"Interactive Environment-Aware Handheld Projectors for Pervasive Computing Spaces", In Proceedings of 10th International Conference on Pervasive Computing, Jun. 18, 2012, 18 pages.
Perl,"Cross-Platform Tracking of a 6DoF Motion Controller", In Master's Thesis of Institute of Software Technology and Interactive Systems, Dec. 2012, 140 pages.
Schneider,"Virtual Reality Basics", Available at: http://www.tomshardware.com/reviews/virtual-reality-basics.4220.html, Oct. 12, 2015, 14 pages.

* cited by examiner

POSITION-DETERMINING INPUT DEVICE

BACKGROUND

Virtual reality and augmented reality systems and devices are increasingly popular, particularly for gaming applications in which a user can immerse him or herself into the gaming environment when wearing a head-mounted display unit that displays virtual and/or augmented reality user experiences. Some conventional virtual and augmented reality systems are marker-based systems, some relying on external markers to track the motion of a device, while others rely on externally positioned cameras that provide feedback images from which the motion of the device in the systems can be tracked. For example, a virtual reality system may include a head-mounted display unit and an external input device. To accurately track the external input device in relation to the head-mounted display unit, external cameras positioned in the three-dimensional (3D) space in which the external input device is used track the motion of the input device for correlation with the head-mounted display unit. Additionally, an external input device may be designed with an inertial measurement unit to track velocity and acceleration of the device. However, due to drift, inertial measurement units do not provide and maintain accurate device position information over time (e.g., translation information), as is needed for precise position and correlation in a virtual and/or augmented reality system.

SUMMARY

This Summary introduces features and concepts of a camera-based input device, which is further described below in the Detailed Description and/or shown in the Figures. This Summary should not be considered to describe essential features of the claimed subject matter, nor used to determine or limit the scope of the claimed subject matter.

A camera-based input device is described. In embodiments, an input device includes an inertial measurement unit that collects motion data associated with velocity and acceleration of the input device in an environment, such as in three-dimensional (3D) space. The input device also includes at least two visual light cameras that capture images of the environment. A positioning application is implemented to receive the motion data from the inertial measurement unit, and receive the images of the environment from the at least two visual light cameras. The positioning application can then determine positions of the input device based on the motion data and the images correlated with a map of the environment, and track a motion of the input device in the environment based on the determined positions of the input device.

In other aspects of the camera-based input device, the two (or more) visual light cameras can be implemented as high-speed monochromatic or black-and-white cameras that capture the images of the environment. In implementations, the cameras are positioned in the input device for a maximum field of view of the environment. Additionally, a pair of the visual light cameras can operate as a stereo camera for 3D imaging in the 3D space of the environment, or a single camera with input for simultaneous localization and mapping (SLAM) can be implemented for the 3D imaging. The camera-based input device can be implemented for input control in an alternate reality system, such as for augmented reality and/or virtual reality, and the input device includes a user-selectable input effective to initiate a control input to a mixed reality device. Further, the positioning application can be utilized to correlate the determined positions of the input device with another device.

In other aspects, the camera-based input device can be implemented with a wireless communication system to wirelessly connect the input device to a communication-enabled device via a wireless network. A controller application of the input device can receive a user-selectable input effective to initiate a control input to the communication-enabled device, and the control input is communicated from the input device to the communication-enabled device via the wireless network. In other aspects, the controller application can receive the motion data from the inertial measurement unit, and determine that the input device is either moving or not moving based on the motion data. The controller application can then power-off an imaging system of the input device if the input device is determined as not moving, where the imaging system includes the visual light cameras. Alternatively, the controller application can power-on the imaging system of the input device if the input device is determined as moving.

BRIEF DESCRIPTION OF THE DRAWINGS

Embodiments of a camera-based input device are described with reference to the following Figures. The same numbers may be used throughout to reference like features and components that are shown in the Figures.

DETAILED DESCRIPTION

Embodiments of a camera-based input device are described, and the input device includes an inertial measurement unit that collects motion data associated with velocity and acceleration of the input device in an environment, such as in three-dimensional (3D) indoor or outdoor space. In implementations, the input device also includes at least two visual light cameras that capture images of the environment. The cameras can be high-speed monochromatic or black-and-white cameras, and are visual light cameras that capture the images of the environment without the need for emitted and/or reflected light, such as with infra-red (IR) and other types of cameras that image by detecting reflected light.

A positioning application can be implemented as a software application in the camera-based input device, and the positioning application receives the motion data from the inertial measurement unit, and receives the images of the environment from the two (or more) visual light cameras. The positioning application can then determine positions of the input device based on both the motion data and the images correlated with a map of the environment, and the positioning application tracks a motion of the input device in the 3D environment based on the determined positions of the input device. In aspects of the camera-based input device, the environment itself does not need to be modified to support the input device capability of determining its own location and orientation in the 3D environment (e.g., in coordinate space). No external markers, cameras, or other hardware is needed, but rather, the input device can independently determine its own position and motion tracking in the environment.

Further, the positioning application of the camera-based input device can wirelessly communicate to correlate the positions of the input device with another device implemented for virtual reality and/or augmented reality, such as a head-mounted display unit that a person can wear to immerse him or herself in a virtual and/or augmented reality environment. Generally, the term "alternate reality" is used herein to refer to devices and systems that are implemented for virtual reality and/or augmented reality, such as for mixed reality devices.

While features and concepts of a camera-based input device can be implemented in any number of different devices, systems, networks, environments, and/or configurations, embodiments of a camera-based input device are described in the context of the following example devices, systems, and methods.

Figure 1:
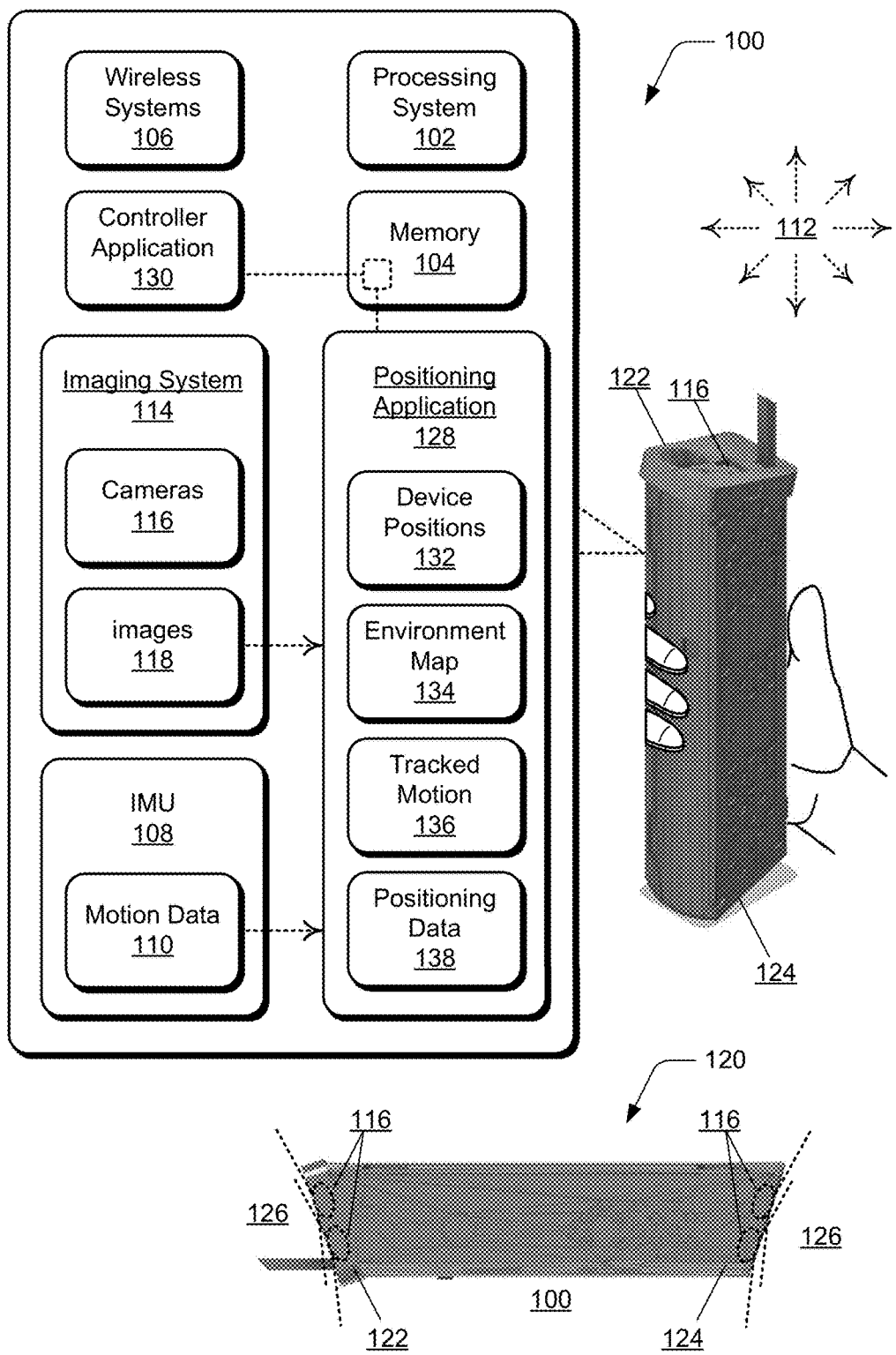
FIG. 1 illustrates an example camera-based input device in accordance with one or more embodiments.

FIG. 1 illustrates an example input device 100 in which embodiments of a camera-based input device can be implemented. The example input device 100 can be implemented with various components, such as a processing system 102 and memory 104 (e.g., non-volatile, physical memory), and with any number and combination of differing components as further described with reference to the example device shown in FIG. 5. In implementations, the processing system 102 may include multiple and/or different processors, such as a microprocessor, a separate graphics processor, and/or a separate high-speed, dedicated processor for tracking motion of the input device. Although not shown, the input device 100 includes a power source, such as a battery, to power the various device components. Further, the input device 100 is a wireless communication-enabled device and can include different wireless radio systems 106, such as for Wi-Fi, Bluetooth™, Mobile Broadband, LTE, as well as 802.11a/b/g/n/ac network connectivity technologies, and/or any other wireless communication system or format. Generally, the input device 100 implements one or more wireless communication systems that each include a radio device, antenna, and chipset that is implemented for wireless communication with other devices, networks, and services.

The input device 100 can include various different types of sensors, such as an inertial measurement unit 108 implemented as a motion sensor in this example input device. The inertial measurement unit 108 can collect motion data 110 associated with the velocity and acceleration of the input device 100 in an environment 112, such as in three-dimensional (3D) indoor or outdoor space. Generally, the inertial measurement unit can include an accelerometer and gyroscope to detect changes in position, angular velocity, and linear acceleration of the input device 100 as a user manipulates and moves the device. Although generally described as a handheld device that is moved around when held by a user, the input device 100 may be attached to any moving device or item, such as a remotely controlled vehicle or robot for use as an external tracking system, or the input device 100 may be positioned in a static location in the environment.

The input device 100 has an imaging system 114 with cameras 116 that capture images 118 of the environment 112 in which the input device is positioned. In implementations, the cameras 116 are two (or more) visual light cameras, such as high-speed monochromatic or black-and-white cameras that capture the images 118 in the 3D environment. Alternatively, a single camera 116 can be implemented with simultaneous localization and mapping (SLAM) for the 3D imaging of the environment. In implementations, the cameras 116 are visual light cameras that capture the images 118 of the environment 112 without the need for emitted and/or reflected light, such as with infra-red (IR) and other types of cameras that image by detecting reflected light. The cameras 116 can be integrated at various positions in a housing of the input device 100, such as at opposing ends of the input device. Generally, the cameras 116 are positioned in the input device for a maximum field of view of the environment, such as for maximum visibility of the environment providing the best opportunity to image visual points in the environment for device tracking. This is generally illustrated at 120 where a first end 122 of the input device 100 includes two of the cameras 116, and a second end 124 of the input device includes an additional two of the cameras 116. The cameras 116 are positioned in the input device 100 to cover a large field-of-view 126 to facilitate tracking the motion of the input device in the environment, based on the orientation and position of the input device in 3D space.

The cameras 116 are merely shown at 120 for general discussion of the implementation in the input device 100, and in practice, may be smaller (e.g., approximately one centimeter square) and integrated in a housing of the input device in various configurations. Further, although the input device 100 is generally described and shown as having four of the visible light cameras 116, the input device may be implemented with any number of cameras (e.g., two cameras) positioned on any number of sides and/or ends of the input device to cover by field-of-view as much of the visible area of the environment 112 as can be imaged. Further, a pair (or more than one pair) of the visual light cameras can be implemented in the imaging system 114 to operate as a stereo camera for 3D imaging in the 3D environment.

The input device 100 includes a positioning application 128 and a controller application 130, and the applications can be implemented as software applications or modules, such as computer-executable software instructions that are executable with the processing system 102 to implement embodiments of a camera-based input device. As indicated, the positioning application 128 and/or the controller application 130 can be stored on computer-readable storage memory (e.g., the memory 104), such as any suitable memory device or electronic data storage implemented in the input device. Further, although the positioning application 128 and the controller application 130 are shown as separate software applications or modules, the positioning application and the controller application may be implemented together and/or integrated with an operating system of the input device.

In embodiments, the positioning application 128 is implemented to receive the motion data 110 from the inertial measurement unit 108 and receive the images 118 of the environment 112 from the visual light cameras 116. The positioning application 128 can then determine device positions 132 of the input device 100 based on both the motion data 110 and the images 118 correlated with a map 134 of the environment. The positioning application 128 can then track the motion 136 of the input device in the 3D environment 112 based on the determined device positions 132 of the input device. The positioning application 128 can be implemented with algorithms, such as a prediction algorithm to predict device positions and a simultaneous localization and mapping (SLAM) algorithm for motion tracking of the input device 100 in the 3D environment 112. The prediction algorithm can be utilized to predict forward positions of the input device 100 based on the current motion of the device and based on motion models of what is reasonable for motion of the input device 100 in the environment, such as when held and moved by a user.

Further, the positioning application 128 can generate the map 134 of the environment 112 with the prediction and mapping algorithms, such as based on feature points and descriptors extracted from the images 118 of the environment and utilizing image patch matching techniques to correlate the input device positions 132 in the environment. As noted above, the environment itself does not need to be modified to support the input device 100 capability of determining its own location and orientation in the 3D environment 112 (e.g., in coordinate space). No external markers, cameras, or other hardware is needed, but rather, the input device 100 can independently determine its own position and motion tracking in the environment. This is also commonly referred to as "inside out" tracking, performed by the device itself by using the cameras 116 and sensors (e.g., the inertial measurement unit 108) that are implemented in the device.

Additionally, the positioning application 128 can utilize other positioning data 138 (e.g., for orientation, velocity, acceleration, etc.) and/or communicate the positioning data 138 to another device. The positioning application 128 can correlate the device positions 132 of the input device 100 with another device implemented for virtual reality and/or augmented reality, such as a head-mounted display unit that a person can wear to immerse him or herself in a virtual and/or augmented reality environment. Generally, the term "alternate reality" is used herein to refer to devices and systems that are implemented for virtual reality and/or augmented reality, such as for mixed reality devices. For example, an augmented reality device may be implemented with the ability to block out visual pixels and operate as a virtual reality device, or a virtual reality device may be implemented with a pass-through camera through the display to mix reality with virtual objects, such as in an augmented reality device.

In implementations, the input device 100 can include a user-selectable input, such as a push-button or other type of input activation, effective to initiate a control input being communicated to a mixed reality device. As noted above, a wireless radio system 106 of the input device 100 can be used to wirelessly connect the input device 100 to a communication-enabled device via a wireless network, and a user of the input device 100 can initiate control of features that may be displayed in a virtual reality and/or augmented reality device (e.g., a mixed reality device) worn by the user, or worn by another user.

In implementations, the controller application 130 can be designed to receive the motion data 110 from the inertial measurement unit 108 and determine that the input device is moving or not moving based on the motion data. The controller application 130 can then power-off the imaging system 114 that includes the cameras 116 if the input device 100 is determined not to be moving (and the imaging system is currently powered on). Alternatively, the controller application 130 can power-on the imaging system 114 of the input device if the input device is determined to be moving (and the imaging system is currently powered off).

Figure 2:
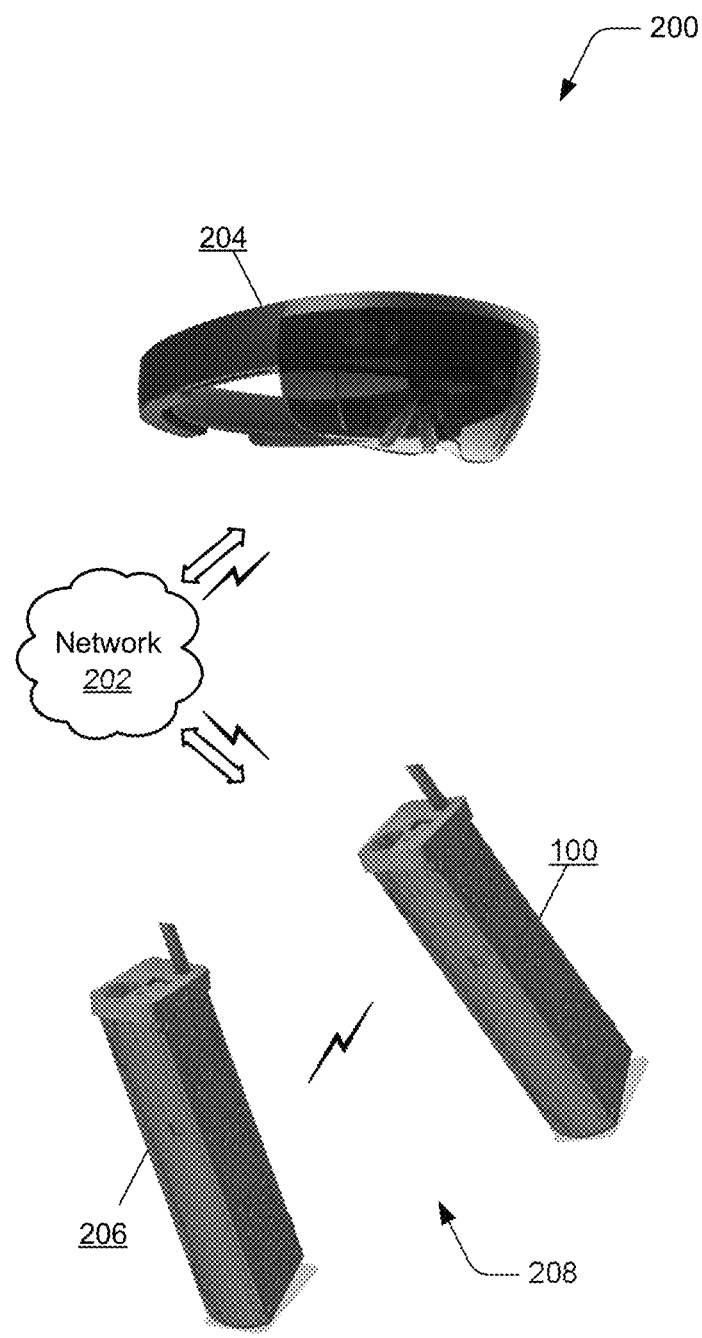
FIG. 2 illustrates an example system in which embodiments of a camera-based input device can be implemented.

FIG. 2 illustrates an example system 200 in which embodiments of a camera-based input device can be implemented. As described herein, the input device 100 that is shown and described with reference to FIG. 1 can be utilized as an input device to control another communication-enabled device via a network 202, and/or to enhance a virtual reality and/or augmented reality immersive environment for a user. Any of the devices described herein can communicate via the network 202, such as for video and data communication between the input device 100 and a head-mounted display unit 204. The network can be implemented to include a wired and/or a wireless network. The network can also be implemented using any type of network topology and/or communication protocol, and can be represented or otherwise implemented as a combination of two or more networks, to include IP based networks and/or the Internet. The network may also include mobile operator networks that are managed by a mobile network operator and/or other network operators, such as a communication service provider, mobile phone provider, and/or Internet service provider.

In implementations, the input device 100 can wirelessly communicate, such as via Wi-Fi and Bluetooth™ with the head-mounted display unit 204, which may be any type of viewing device for virtual reality and/or augmented reality, or may be virtual reality glasses, augmented reality glasses, a mobile device with an integrated display, and/or a display device coupled to a computing device. Additionally, a network connection may be established between multiple devices, such as the input device 100 is wirelessly connected to another input device 206, as shown at 208. Further, multiple input devices 100, 206 (or more) can be utilized with one head-mounted display unit 204, or similarly, one input device 100 may be used in a virtual or augmented reality system with multiple head-mounted display units for several users.

In another example implementation, the tracking motion 136 of the input device 100 by the positioning application 128 can be used to create a network connection between two devices, such as a user motion of the input device 100 that represents a connection between the devices, and the network connection is established. For example, the user motion of the input device 100 can be detected as a gesture command for a printer device to print image files stored on a Wi-Fi linked camera, where the devices are all communicating on the same network 202. These features can be implemented with the precise motion tracking that is enabled with the techniques for a camera-based input device, as described herein.

Example methods 300 and 400 are described with reference to respective FIGS. 3 and 4 in accordance with one or more embodiments of a camera-based input device. Generally, any of the components, modules, methods, and operations described herein can be implemented using software, firmware, hardware (e.g., fixed logic circuitry), manual processing, or any combination thereof. Some operations of the example methods may be described in the general context of executable instructions stored on computer-readable storage memory that is local and/or remote to a computer processing system, and implementations can include software applications, programs, functions, and the like. Alternatively or in addition, any of the functionality described herein can be performed, at least in part, by one or more hardware logic components, such as, and without limitation, Field-programmable Gate Arrays (FPGAs), Application-specific Integrated Circuits (ASICs), Application-specific Standard Products (ASSPs), System-on-a-chip systems (SoCs), Complex Programmable Logic Devices (CPLDs), and the like.

Figure 3:
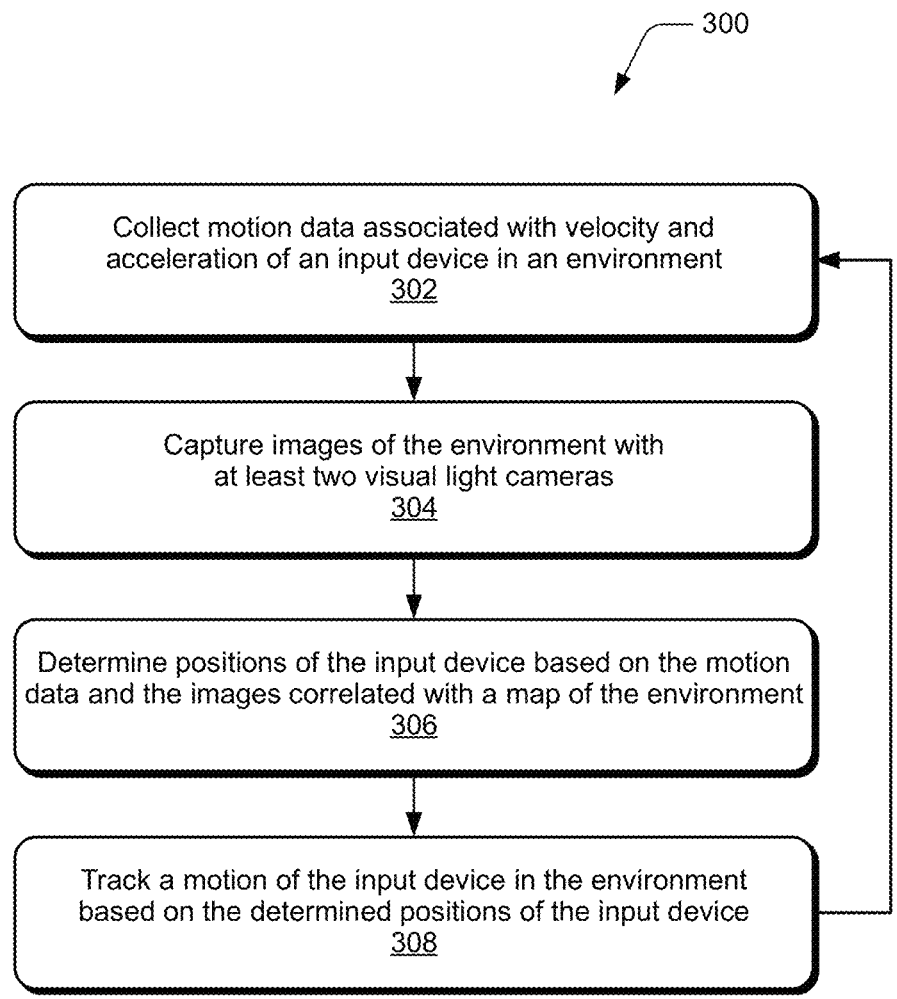
FIG. 3 illustrates example method(s) of a camera-based input device in accordance with one or more embodiments.

FIG. 3 illustrates example method(s) 300 of a camera-based input device, and is generally described with reference to a method for tracking motion of an input device in an environment. The order in which the method is described is not intended to be construed as a limitation, and any number or combination of the method operations can be performed in any order to implement a method, or an alternate method.

At 302, motion data associated with velocity and acceleration of an input device in an environment is collected. For example, the inertial measurement unit 108 that is implemented in the input device 100 as a motion sensor collects the motion data 110 associated with velocity and acceleration of the input device 100 in the environment 112, such as in a three-dimensional (3D) space.

At 304, images of the environment are captured with at least two visual light cameras. For example, the visual light cameras 116 of the imaging system 114 implemented in the input device 100 capture the images 118 of the overall environment 112 in which the input device is used. In implementations, the two (or more) visual light cameras 116 are high-speed monochromatic or black-and-white cameras that capture the images 118 of the environment, and the pair of the visual light cameras can be operated as a stereo camera for three-dimensional (3D) imaging of the environment.

At 306, positions of the input device are determined based on the motion data and the images correlated with a map of the environment. For example, the positioning application 128 that is implemented in the input device 100 determines the device positions 132 of the input device in the environment 112 based on both the motion data 110 and the images 118 correlated with the environment map 134. The map 134 of the environment can be obtained and/or is generated by the positioning application 128 that implements prediction and mapping algorithms.

At 308, a motion of the input device is tracked in the environment based on the determined positions of the input device. For example, the positioning application 128 that is implemented in the input device 100 tracks the motion 136 of the input device in the 3D space environment 112 based on the determined device positions 132 of the input device.

Figure 4:
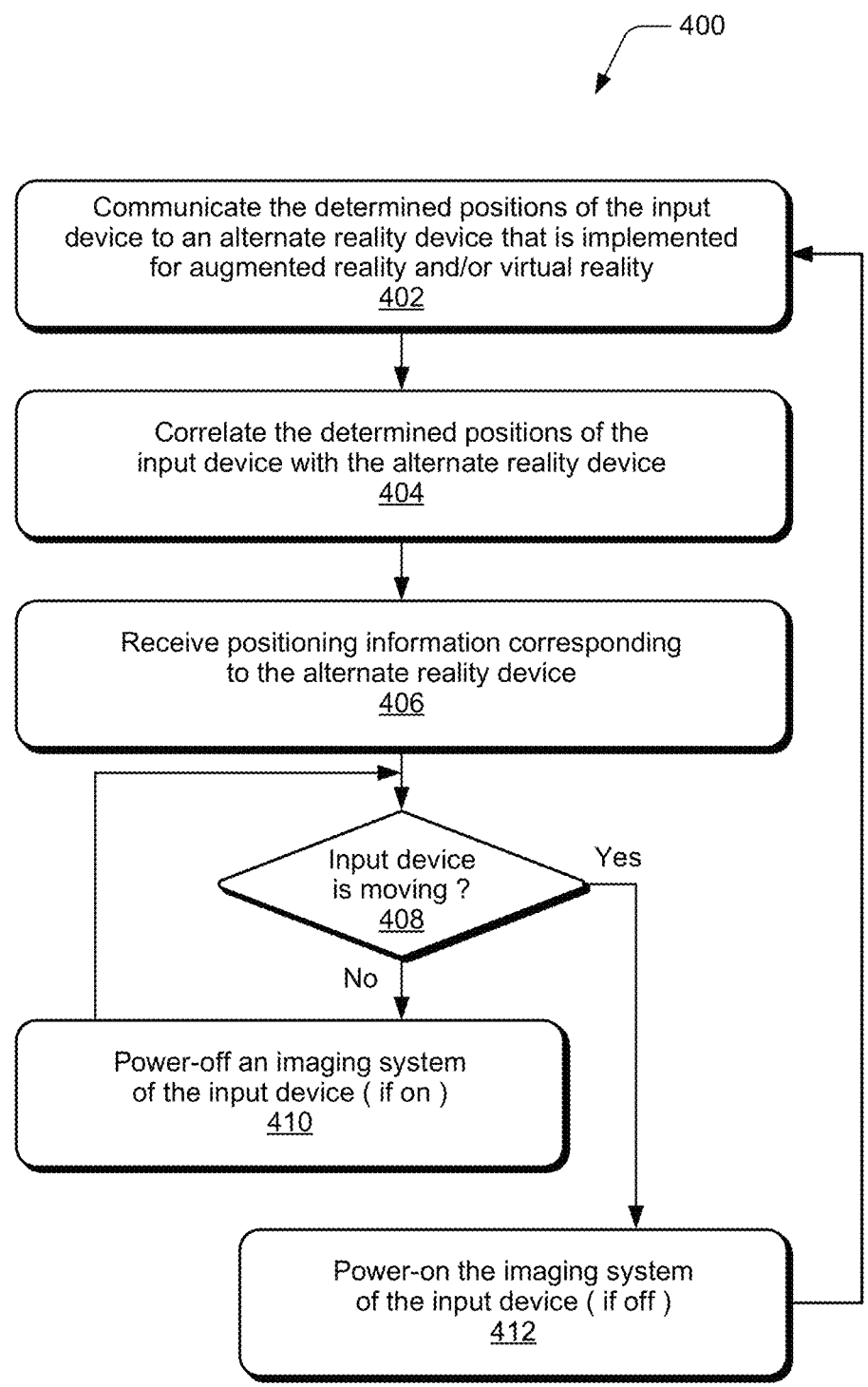
FIG. 4 illustrates example method(s) of a camera-based input device in accordance with one or more embodiments.

FIG. 4 illustrates example method(s) 400 of a camera-based input device, and is generally described with reference to the input device described herein. The order in which the method is described is not intended to be construed as a limitation, and any number or combination of the method operations can be performed in any order to implement a method, or an alternate method.

At 402, the determined positions of the input device are communicated to an alternate reality device that is implemented for augmented reality and/or virtual reality. For example, the input device 100 includes a wireless radio system 106 to wirelessly connect the input device to another communication-enabled device via the wireless network 202, such as wirelessly connected to the head-mounted display unit 204 (e.g., an alternate reality device) that is implemented for augmented reality and/or virtual reality as a mixed reality device.

At 404, the determined positions of the input device are correlated with the alternate reality device. For example, the positioning application 128 that is implemented in the input device 100 correlates the device positions 132 of the input device with the head-mounted display unit 204 (e.g., the alternate reality device or any other type of communication-enabled device).

At 406, positioning information corresponding to the alternate reality device is received. For example, the positioning application 128 that is implemented in the input device 100 receives the positioning data 138 that corresponds to the head-mounted display unit 204 (e.g., for augmented reality and/or virtual reality), and the positioning application 128 can utilize the positioning data 138 to synchronize locations of the input device 100 in the environment 112 with respect to the alternate reality device.

At 408, a determination is made as to whether the input device is moving or not moving based on the motion data. For example, the controller application 130 that is implemented in the input device 100 determines whether the input device is moving or not moving based on the motion data 110, as detected by the inertial measurement unit 108. If the input device 100 is not moving (i.e., "No" from 408), then at 410, the controller application 130 powers-off the imaging system 114 of the input device 100 (e.g., if the input device is on), and the imaging system 114 includes the visible light cameras 116. If the input device 100 is moving (i.e., "Yes" from 408), then at 412, the controller application 130 powers-on the imaging system 114 of the input device 100 (e.g., if the input device is off).

Figure 5:
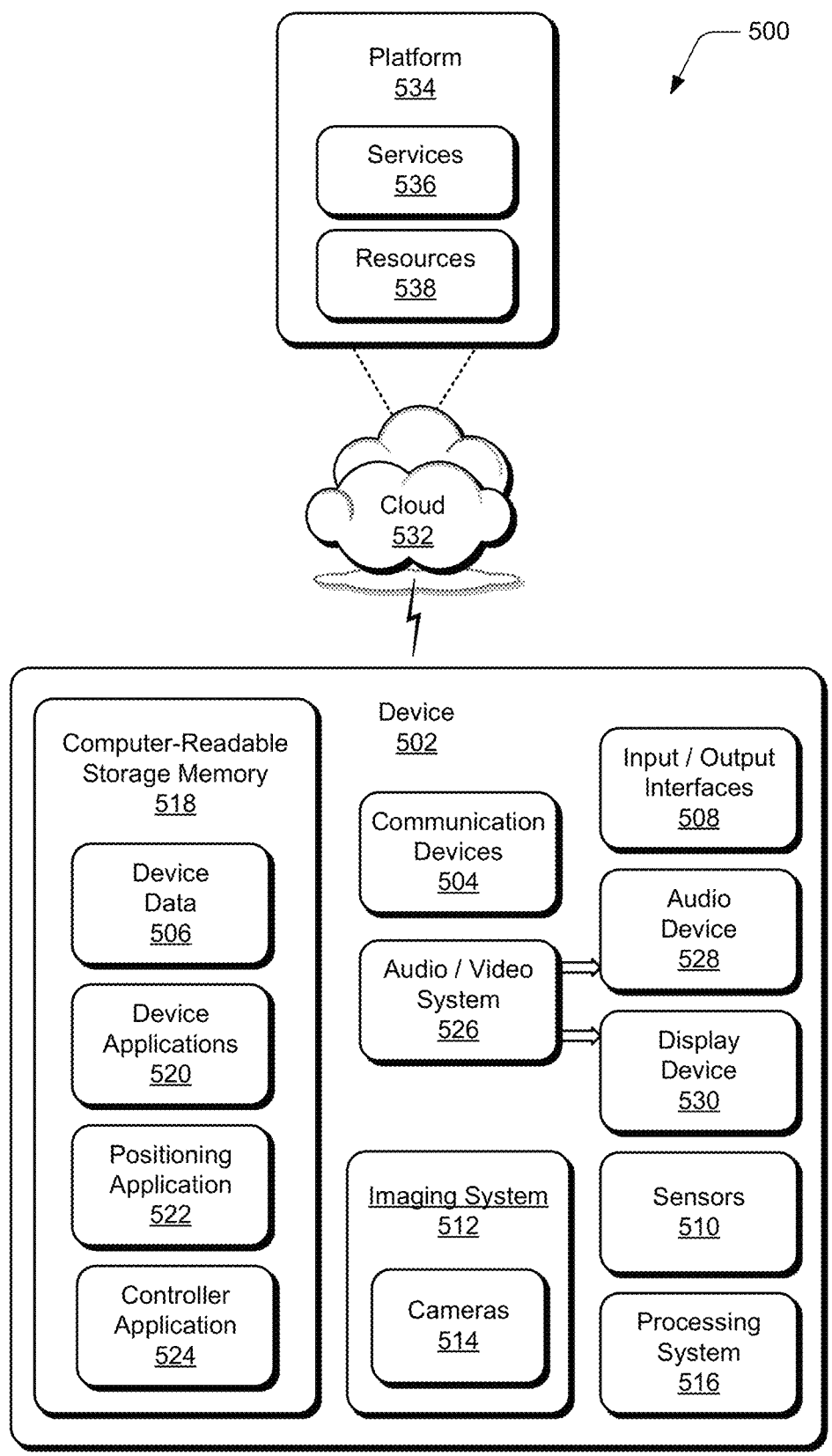
FIG. 5 illustrates an example system with an example device that can implement embodiments of a camera-based input device.

FIG. 5 illustrates an example system 500 that includes an example device 502, which can implement embodiments of a camera-based input device. The example device 502 can be implemented as any of the computing devices, user devices, and server devices described with reference to the previous FIGS. 1-4, such as any type of mobile device, wearable device, client device, mobile phone, tablet, computing, communication, entertainment, gaming, media playback, and/or other type of device. For example, the input devices and wearable devices described herein may be implemented as the example device 502 or with various components of the example device.

The device 502 includes communication devices 504 that enable wired and/or wireless communication of device data 506, such as sensor data, images captured by the cameras, and positioning data associated with one or more of the devices. Additionally, the device data can include any type of audio, video, and/or image data. The communication devices 504 can also include transceivers for cellular phone communication and for network data communication.

The device 502 also includes input/output (I/O) interfaces 508, such as data network interfaces that provide connection and/or communication links between the device, data networks, and other devices described herein. The I/O interfaces can be used to couple the device to any type of components, peripherals, and/or accessory devices. The I/O interfaces also include data input ports via which any type of data, media content, and/or inputs can be received, such as user inputs to the device, as well as any type of audio, video, and/or image data received from any content and/or data source. The device 502 includes any type of sensors 510 (e.g., motion sensors), such as the inertial measurement unit 108 implemented in the input device 100. The device 502 also includes an imaging system 512 that includes cameras 514 used to capture images. Examples of the imaging system 512 and the cameras 514 include the imaging system 114 and the visual light cameras 116 implemented in the input device 100, as described with reference to FIGS. 1-4.

The device 502 includes a processing system 516 that may be implemented at least partially in hardware, such as with any type of microprocessors, controllers, and the like that process executable instructions. The processing system can include components of an integrated circuit, programmable logic device, a logic device formed using one or more semiconductors, and other implementations in silicon and/or hardware, such as a processor and memory system implemented as a system-on-chip (SoC). Alternatively or in addition, the device can be implemented with any one or combination of software, hardware, firmware, or fixed logic circuitry that may be implemented with processing and control circuits. The device 502 may further include any type of a system bus or other data and command transfer system that couples the various components within the device. A system bus can include any one or combination of different bus structures and architectures, as well as control and data lines.

The device 502 also includes a computer-readable storage memory 518, such as data storage devices that can be accessed by a computing device, and that provide persistent storage of data and executable instructions (e.g., software applications, programs, functions, and the like). Examples of the computer-readable storage memory 518 include volatile memory and non-volatile memory, fixed and removable media devices, and any suitable memory device or electronic data storage that maintains data for computing device access. The computer-readable storage memory can include various implementations of random access memory (RAM) (e.g., the DRAM and battery-backed RAM), read-only memory (ROM), flash memory, and other types of storage media in various memory device configurations.

The computer-readable storage memory 518 provides storage of the device data 506 and various device applications 520, such as an operating system that is maintained as a software application with the computer-readable storage memory and executed by the processing system 516. In this example, the device applications include a positioning application 522 and a controller application 524 that implement embodiments of a camera-based input device, such as when the example device 502 is implemented as the input device 100 described herein with reference to FIGS. 1-4. Examples of the positioning application 522 and the controller application 524 include the positioning application 128 and the controller application 130 implemented in the input device 100, as described with reference to FIGS. 1-4.

The device 502 also includes an audio and/or video system 526 that generates audio data for an audio device 528 and/or generates display data for a display device 530. The audio device and/or the display device include any devices that process, display, and/or otherwise render audio, video, display, and/or image data. In implementations, the audio device and/or the display device are integrated components of the example device 502. Alternatively, the audio device and/or the display device are external, peripheral components to the example device.

In embodiments, at least part of the techniques described for a camera-based input device may be implemented in a distributed system, such as over a "cloud" 532 in a platform 534. The cloud 532 includes and/or is representative of the platform 534 for services 536 and/or resources 538. The platform 534 abstracts underlying functionality of hardware, such as server devices (e.g., included in the services 536) and/or software resources (e.g., included as the resources 538), and connects the example device 502 with other devices, servers, etc. The resources 538 may also include applications and/or data that can be utilized while computer processing is executed on servers that are remote from the example device 502. Additionally, the services 536 and/or the resources 538 may facilitate subscriber network services, such as over the Internet, a cellular network, or Wi-Fi network. The platform 534 may also serve to abstract and scale resources to service a demand for the resources 538 that are implemented via the platform, such as in an interconnected device embodiment with functionality distributed throughout the system 500. For example, the functionality may be implemented in part at the example device 502 as well as via the platform 534 that abstracts the functionality of the cloud.

Although embodiments of a camera-based input device have been described in language specific to features and/or methods, the appended claims are not necessarily limited to the specific features or methods described. Rather, the specific features and methods are disclosed as example implementations of a camera-based input device, and other equivalent features and methods are intended to be within the scope of the appended claims. Further, various different embodiments are described and it is to be appreciated that each described embodiment can be implemented independently or in connection with one or more other described embodiments. Additional aspects of the techniques, features, and/or methods discussed herein relate to one or more of the following embodiments.

An input device implemented for input control in an alternate reality system, the input device comprising: an inertial measurement unit configured to collect motion data associated with velocity and acceleration of the input device in an environment; at least two visual light cameras configured to capture images of the environment; a memory and processor system configured to execute a positioning application that is implemented to: receive the motion data from the inertial measurement unit; receive the images of the environment from the at least two visual light cameras; determine positions of the input device based on the motion data and the images correlated with a map of the environment; and track a motion of the input device in the environment based on the determined positions of the input device.

Alternatively or in addition to the above described input device, any one or combination of: the at least two visual light cameras are high-speed monochromatic cameras configured to capture the images of the environment. The at least two visual light cameras are positioned in the input device for a maximum field of view of the environment. The at least two visual light cameras operate as a stereo camera for three-dimensional (3D) imaging. The environment is in three-dimensional (3D) space, and the positioning application is configured to said track the motion of the input device in the 3D space. The alternate reality system is implemented for at least one of augmented reality and virtual reality, the input device further comprising a user-selectable input effective to initiate a control input to a mixed reality device in the alternate reality system. The positioning application is configured to correlate the determined positions of the input device with another device. The input device further comprises a controller application implemented by the memory and processor system to: receive the motion data from the inertial measurement unit; determine that the input device is one of moving or not moving based on the motion data; and power-off an imaging system of the input device if the input device is determined as not moving, the imaging system including the at least two visual light cameras; or power-on the imaging system of the input device if the input device is determined as moving. The input device further comprises a wireless communication system configured to wirelessly connect the input device to a communication-enabled device via a wireless network; a controller application implemented by the memory and processor system to: receive a user-selectable input effective to initiate a control input to the communication-enabled device; and initiate communication of the control input from the input device to the communication-enabled device via the wireless network.

A method for tracking motion of an input device in an environment, the method comprising: collecting motion data associated with velocity and acceleration of the input device in the environment; capturing images of the environment with at least two visual light cameras; determining positions of the input device based on the motion data and the images correlated with a map of the environment; and tracking a motion of the input device in the environment based on the determined positions of the input device.

Alternatively or in addition to the above described method, any one or combination of: the environment is in three-dimensional (3D) space, and said tracking the motion of the input device in the 3D space. The at least two visual light cameras operate as a stereo camera for three-dimensional (3D) imaging. The at least two visual light cameras are high-speed monochromatic cameras said capturing the images of the environment. The method further comprising communicating the determined positions of the input device to an alternate reality device that is implemented for at least one of augmented reality and virtual reality. The method further comprising correlating the determined positions of the input device with the alternate reality device; and receiving positioning information corresponding to the alternate reality device. The method further comprising determining that the input device is one of moving or not moving based on the motion data; and powering-off an imaging system of the input device if the input device is said determined as not moving, the imaging system including the at least two visual light cameras; or powering-on the imaging system of the input device if the input device is said determined as moving.

An input device implemented for independent motion tracking of itself, the input device comprising: a motion sensor configured to detect motion of the input device; visual light cameras configured to capture images in three-dimensional (3D) space; a positioning system configured to: determine positions of the input device based on the detected motion and the images; and track the motion of the input device in the 3D space based on the determined positions of the input device.

Alternatively or in addition to the above described method, any one or combination of: the motion sensor is an inertial measurement unit configured to collect velocity and acceleration of the input device; and the visual light cameras include at least two high-speed monochromatic cameras configured to capture the images of the 3D space. The visual light cameras are positioned in the input device for a maximum field of view of the environment; and a pair of the visual light cameras operate as a stereo camera for 3D imaging of the 3D space. The input device further comprising a wireless communication system configured to communicate the determined positions of the input device to an alternate reality device that is implemented for at least one of augmented reality and virtual reality.

The invention claimed is:

1. An input device, comprising:
   an elongated graspable housing configured to be grasped by a hand of a user, the elongated graspable housing extending between a first end and a second end opposing the first end;
   an inertial measurement unit configured to collect motion data associated with velocity and acceleration of the input device in an environment;
   first and second visual light cameras located on the first end of the elongated graspable housing and configured to capture visual light stereo images of the environment;
   third and fourth visual light cameras located on the second end of the elongated graspable housing and configured to capture additional visual light stereo images of the environment;
   a processor; and
   storage storing executable instructions which, when executed by the processor, cause the processor to:
   receive the motion data from the inertial measurement unit of the input device;
   receive the visual light stereo images and the additional visual light stereo images of the environment from the first, second, third, and fourth visual light cameras;
   generate a map of the environment using the visual light stereo images and the additional visual light stereo images;
   determine positions of the input device in the environment by correlating the motion data with the map of the environment;
   track motion of the input device in the environment based at least on the determined positions of the input device; and
   create a network connection between the input device and one or more other devices based at least on the tracked motion of the input device in the environment.

2. The input device of claim 1, wherein the first and second visual light cameras are high-speed monochromatic cameras configured to capture the visual light stereo images of the environment.

3. The input device of claim 1, wherein the first and second visual light cameras have an overlapping field of view of the environment and are configured to operate as a stereo camera for three-dimensional imaging of the environment.

4. The input device of claim 1, wherein the first and second visual light cameras face a substantially opposite direction from the third and fourth visual light cameras.

5. The input device of claim 1, wherein the executable instructions further cause the processor to generate the map of the environment by:
   extracting feature points from the visual light stereo images and the additional visual light stereo images.

6. The input device of claim 5, wherein the executable instructions further cause the processor to:
   determine the positions of the input device in the environment by utilizing image patch matching techniques.

7. The input device of claim 1, wherein, when the elongated graspable housing is in a vertical orientation, the first and second visual light cameras face vertically upward and the third and fourth visual light cameras face vertically downward.

8. The input device of claim 1, wherein the executable instructions further cause the processor to:
   based at least on the tracked motion of the input device, power-off at least the first visual light camera in an instance where the input device has stopped moving.

9. The input device of claim 1, further comprising a wireless communication system configured to wirelessly connect the input device to another device.

10. A method comprising:
    collecting motion data associated with velocity and acceleration of an input device in an environment, the input device having an elongated graspable housing that is graspable by a hand of a user, the elongated graspable housing extending between a first end and a second end opposing the first end;
    capturing visual light images of the environment in at least two different directions away from the input device with multiple visual light cameras, the multiple visual light cameras including at least a first visual light camera positioned on the first end of the elongated graspable housing and a second visual light camera positioned on the second end of the elongated graspable housing, the first visual light camera and the second visual light camera facing opposite directions;

generating a map of the environment based at least on the visual light images of the environment;

determining positions of the input device based at least on the motion data and the visual light images of the environment;

tracking a motion of the input device in the environment based at least on the determined positions of the input device; and creating a network connection between the input device and one or more other devices based at least on the tracked motion of the input device in the environment.

11. The method of claim 10, performed entirely by the input device.

12. The method of claim 10, wherein the first visual light camera comprises a first stereo camera configured to provide first visual light stereo images and the second visual light camera comprises a second stereo camera configured to provide second visual light stereo images.

13. The method of claim 10, wherein the network connection is created with a printer.

14. The method of claim 13, further comprising:
associating a gesture command to create the network connection with the tracked motion of the input device in the environment.

15. The method of claim 10, further comprising:
in a first instance where the tracking the motion indicates that the input device is not moving, powering-off the multiple visual light cameras; and
in a second instance where the tracking the motion indicates that the input device is moving, powering-on the multiple visual light cameras.

16. A system comprising:
an input device comprising:
an elongated graspable housing extending between a first end and a second end opposing the first end;
a motion sensor mounted within the elongated graspable housing, the motion sensor configured to detect motion of the input device; and
pairs of visual light cameras mounted on the first end and the second end of the elongated graspable housing, the visual light cameras configured to capture visual light images in an environment;
a processor; and
storage storing executable instructions which, when executed by the processor, cause the processor to:
determine a position of the input device based at least on motion of the input device detected by the motion sensor and the visual light images captured by the visual light cameras;
track the motion of the input device in the environment based at least on the determined position of the input device; and
create a network connection between the input device and one or more other devices based at least on the tracked motion of the input device in the environment.

17. The system of claim 16, wherein the pairs of visual light cameras comprise a first pair of visual light cameras mounted on the first end of the elongated graspable housing and a second pair of visual light cameras mounted on the second end of the elongated graspable housing, the first pair of visual light cameras and the second pair of visual light cameras facing approximately 180 degrees apart.

18. The system of claim 17, wherein the executable instructions, when executed by the processor, cause the processor to:
receive positioning data reflecting another position of a separate alternate reality device; and
based at least on the positioning data received from the separate alternate reality device, synchronize locations of the input device with respect to the separate alternate reality device.

19. The system of claim 18, further comprising a wireless communication system configured to communicate the determined position of the input device to the separate alternate reality device.

* * * * *